3,850,972
PHENYL ESTERS OF BROMOMETHANESULFONIC ACID

Christian T. Goralski, Midland, Mich., assignor to The Dow Chemical Company, Midland, Mich.
No Drawing. Filed Nov. 9, 1972, Ser. No. 305,106
Int. Cl. C07c 143/68
U.S. Cl. 260—456 R          5 Claims

ABSTRACT OF THE DISCLOSURE

This invention concerns phenyl esters of bromomethanesulfonic acid corresponding to the formula

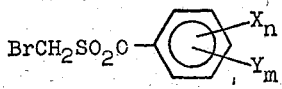

wherein X represents halo, halo lower alkoxy, nitro, trifluoromethyl, or phenoxy and $n$ represents an integer from 0 to 5 for halo groups and from 0 to 1 for groups other than halo; Y represents halo, nitro, or lower alkyl; $m$ represents an integer from 0 to 2; and $m+n$ does not exceed 5. The compounds have antimicrobial or fire-retardant activity. The compounds are prepared by reacting a corresponding phenol with bromomethanesulfonyl chloride or bromide in benzene and in the presence of a small amount of an acid acceptor.

SUMMARY OF THE INVENTION

This invention concerns phenyl esters of bromomethanesulfonic acid corresponding to the formula

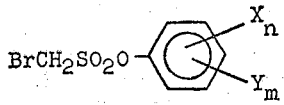

wherein X represents halo, halo lower alkoxy, nitro, trifluoromethyl, or phenoxy and $n$ represents an integer from 0 to 5 for halo groups and from 0 to 1 for groups other than halo; Y represents halo, nitro, or lower alkyl; $m$ represents an integer from 0 to 2; and $m+n$ does not exceed 5. In the specification and claims, the terms "lower alkyl" and "lower alkoxy" designate 1 to 4 carbon straight or branched chain alkyl and alkoxy groups, such as, for example, methyl, ethyl, propyl, isopropyl, butyl, isobutyl, secondary butyl, tertiary butyl; and the corresponding alkoxy groups, respectively. The term "halo" designates fluoro, chloro or bromo. The compounds have antimicrobial or fire-retardant activity. They are prepared by reacting a corresponding phenol with bromomethanesulfonyl chloride or bromide or a mixture thereof in benzene and in the presence of a small amount of an acid acceptor such as triethylamine.

The compounds are crystalline solids or oils which are soluble in common organic solvents, such as, for example, acetone and benzene and slightly soluble in water.

Representative compounds of the present invention include the isomeric mono- and di-chloro- and bromophenyl bromomethanesulfonates, 2,4,6 - tribromophenyl bromomethanesulfonate, pentabromophenyl bromomethanesulfonate, 4-ethoxyphenyl bromomethanesulfonate, phenyl bromomethanesulfonate, 3-nitrophenyl bromomethanesulfonate, 4 - butylphenyl bromomethanesulfonate, 2,6 - dibromo-4-(2,2 - dichloro-1,1-difluoroethoxy)phenyl bromomethanesulfonate, 2,6-dimethylphenyl bromomethanesulfonate, 4 - chloromethoxyphenyl bromomethanesulfonate, 4-phenoxyphenol bromomethanesulfonate, 2-(2,2-dichloro-1,1-difluoroethoxy)phenyl bromomethanesulfonate, 3-(2,2-dichloro - 1,1 - difluoroethoxy)phenyl bromomethanesulfonate, 4-(2,2-dichloro - 1,1 - difluoroethoxy)phenyl bromomethanesulfonate and 4-nitro - 3 - (trifluoromethyl)phenyl bromomethanesulfonate.

The phenyl bromomethanesulfonates are prepared by reacting a corresponding phenol with bromomethanesulfonyl chloride or bromide or mixtures thereof in the presence of an inert organic liquid as reaction medium. Suitable media include, for example, aromatic hydrocarbons such as benzene, toluene and xylene; chlorinated hydrocarbons such as methylene chloride, chloroform and chlorobenzene; and ethers, such as ethyl ether and dioxane. The reaction is carried out at a temperature at which hydrogen chloride or bromide is formed and evolved as a product of reaction, advantageously at a temperature ranging between about 0 and 100° C., preferably between about 10 and about 70° C.

In carrying out the reaction, proportions between about 1 mole of the phenol and about 1 to about 1.2 moles of the bromomethanesulfonyl chloride and/or bromide are advantageously used. An acid acceptor such as, for example, an alkali metal or alkaline earth metal hydroxide, alkali metal carbonate, alkali metal alcoholate or a tertiary amine such as triethylamine or pyridine is advantageously used in an amount at least sufficient to bind the liberated hydrogen halide and preferably up to a 50% excess.

The reaction product is separated and recovered from the reaction medium in usual ways, for example, by addition of water to the reaction medium and extraction of the crude product with chloroform. The crude product is purified by distillation and/or recrystallization from petroleum ether or from a lower alcohol such as methanol or ethanol.

In practice, a solution of bromomethanesulfonyl chloride and/or bromide in benzene or other suitable inert reaction medium is added dropwise with stirring to a benzene or other inert organic solvent solution of the phenol and triethylamine or other acid acceptor with ice-bath cooling. After the addition is completed, the reaction mixture is stirred until the reaction is substantially completed, then filtered to remove triethylamine hydrohalide. The filtrate is washed with water, dried over anhydrous magnesium sulfate and the solvent is vacuum distilled off to leave the product phenyl bromomethanesulfonate.

DESCRIPTION OF THE PREFERRED EMBODIMENTS

The following examples describe completely representative examples and the best mode contemplated by the inventor of carrying out the invention.

EXAMPLE 1

Preparation of 4-(2,2-dichloro-1,1-difluoroethoxy) phenyl bromomethanesulfonate

In a 250 ml. three-neck flask equipped with a magnetic stirrer, a nitrogen inlet, an addition funnel, and a calcium chloride drying tube are placed 12.1 g. (0.05 mole) of 4 - (2,2 - dichloro - 1,1 - difluoroethoxy)phenol, 60 ml. of benzene and 5.0 g. of triethylamine. The mixture is cooled in an ice bath. To this mixture, a solution of 10.74 g. of a mixture of 75% bromomethanesulfonyl chloride and 25% bromomethanesulfonyl bromide in 25 ml. of benzene is added dropwise with stirring. After the addition is complete, the reaction mixture is stirred for 45 minutes, then filtered to remove the triethylamine hydrohalides. The benzene filtrate is washed with water and dried over anhydrous magnesium sulfate. The benzene is removed *in vacuo*, leaving an oil which is vacuum distilled to give 8.40 g. of 4 - (2,2 - dichloro - 1,1 - difluoroethoxy)phenyl bromomethanesulfonate, b.p. 162–166° C./0.35 mm. Hg.

Analysis calculated for: $C_9H_7BrCl_2F_2O_4S$: C, 27.02; H, 1.76; Br, 19.97; Cl, 17.72; F, 9.50; S, 8.01. Found: C, 27.43; H, 1.74; Br, 19.75; Cl, 19.1; F, 9.12; S, 7.93.

The procedure of Example 1 is repeated, substituting an equimolar proportion of the indicated starting phenols in place of 4 - (2,2 - dichloro - 1,1 - difluoroethoxy)-phenol to give the following products having the stated melting points (M.P., ° C.) or boiling points (B.P./mm. Hg).

TABLE I

| Example | Starting phenol | Product | M.P., °C or B.P., °C/mm. Hg |
|---|---|---|---|
| 2 | 2,4,6-tribromophenol | 2,4,6-tribromophenyl bromomethane-sulfonate. | 127–129 |
| 3 | Phenol | Phenyl bromo-methanesulfonate. | 116–120/0.4 |
| 4 | o-(2,2-dichloro-1,1-difluoroethoxy)-phenol. | o-(2,2-dichloro-1,1-difluoroethoxy)-phenyl bromo-methanesulfonate. | 136–140/0.15 |
| 5 | m-(2,2-dichloro 1,1-difluoroethoxy)-phenol. | m-(2,2-dichloro-1,1-difluoroethoxy)-phenyl bromo-methanesulfonate. | 150–156/0.2 |
| 6 | Pentabromophenol | Pentabromophenyl bromomethane-sulfonate. | 159–161 |
| 7 | α,α,α-Trifluoro-4-nitro-m-cresol. | α,α,α-Trifluoro-4-m-tolyl bromo-methane-sulfonate. | 37–38.5 |
| 8 | 2,6-dibromo-4-(2,2-dichloro-1,1-difluoroethoxy)-phenol. | 2,6-dibromo-4-(2,2-dichloro-1,1-difluoroethoxy)-phenyl bromo-methanesulfonate. | 90–91 |
| 9 | 4-phenoxyphenol | 4-phenoxyphenyl bromomethane-sulfonate. | 174–178/0.15 |

The compounds are toxic to many bacterial and fungal organisms such as, for example, *Bacillus subtilis, Mycobacterium phlei, Trichophyton mentagrophytes, Rhizopus nigricans, Aspergillus terreus, Ceratocystis ips* and *Cephaloascus fragans*. This is not to suggest that all of the compounds are effective against the same organisms or at the same concentration. Thus, for example, in conventional *in vitro* agar Petri dish dilution tests, the compounds of Examples 1 through 7 give 100% control against *Trichophyton mentagrophytes* and *Mycobacterium phlei* at 100 to 500 parts per million. The compounds of Examples 1, 3, 4 and 5 give 100% control against *Bacillus subtilis* at 100 to 500 parts per million. The compounds of Examples 2 and 5 give 100% control against *Rhizopus nigricans, Aspergillus terreus, Ceratocystis ips* and *Cephaloascus fragans* at 100 to 500 parts per million. Also, the compound of Example 2 gives 100% control against *Candida albicans, Candida pelliculosa, Pullularia pullulans* and *Trichoderm sp.* Madison P-42 at 500 parts per million in each instance.

The compound of Example 2 when incorporated in Styron 492 high impact grade polystyrene at a level to provide 4.5% bromine, when tested by ASTM Method D-2863 (1969) for fire retardant properties, had a limiting oxygen index of 0.22. The compound of Example 6 similarly incorporated in Styron 492 high impact grade polystyrene to provide a content of 4.8% bromine had a limiting oxygen index of 0.24. A control of Styron 492 high impact polystyrene similarly tested had a limiting oxygen index of 0.18. These data show that the compounds of Examples 2 and 6 are useful fire retardants for the said high impact grade polystyrene.

The phenol, halophenol, nitrophenol, alkylphenol, alkoxyphenol, 2,4,6 - tribromophenol, pentabromophenol, halo-lower alkoxyphenol and 4 - phenoxyphenol starting materials are commercially available products prepared in conventional ways. The (2,2 - dichloro-1,1 - difluoroethoxy) - phenols are prepared by sparging 1,1 - dichloro - 2,2 - difluoroethylene into a mixture of pyrocatechol or resorcinol or hydroquinone and sodium hydroxide in the presence of acetone at a reaction temperature of 0 to about 10° C. over a period of about 2 hours. The solvent is then removed by evaporation under reduced pressure and the residue obtained is dissolved in aqueous 10% potassium hydroxide, filtered, the aqueous solution acidified with dilute hydrochloric acid, extracted with carbon tetrachloride and the extract dried over magnesium sulfate. The carbon tetrachloride is distilled off to give the desired o-, m-, or p-(2,2-dichloro-1,1-difluoroethoxy)phenol. The 2,6 - dibromo - 4 - (2,2 - dichloro-1,1 - difluoroethoxy)phenol is prepared by brominating the 4 - (2,2 - dichloro - 1,1 - difluoroethoxy)phenol in usual ways.

What is claimed is:

1. A phenyl ester of bromomethane sulfonic acid which is substituted in the o-, m- or p-position of the phenyl ring with a (2,2 - dichloro - 1,1 - difluoroethoxy) group and, when so substituted in the p-position, optionally having 2,6 - dibromo substitution in the phenyl ring.

2. The compound of Claim 1 which is p-(2,2-dichloro-1,1 - difluoroethoxy)phenyl bromomethanesulfonate.

3. The compound of Claim 1 which is o-(2,2-dichloro-1,1 - difluoroethoxy)phenyl bromomethanesulfonate.

4. The compound of Claim 1 which is m-(2,2-dichloro - 1,1 - difluoroethoxy)phenyl bromomethanesulfonate.

5. The compound of Claim 1 which is 2,6-dibromo-4-(2,2 - dichloro - 1,1 - difluoroethoxy)phenyl bromomethanesulfonate.

References Cited
UNITED STATES PATENTS

| 3,764,698 | 10/1973 | Partos | 260—456 R |
| 3,745,188 | 7/1973 | Bottorff et al. | 260—456 R |

FOREIGN PATENTS

| 1,324,740 | 7/1973 | Great Britain | 260—456 R |

LEON ZITVER, Primary Examiner

N. MORGENSTERN, Assistant Examiner

U.S. Cl. X.R.

106—15 FP; 424—303; 260—Digest 24